(12) United States Patent
Hardtke

(10) Patent No.: US 8,152,126 B2
(45) Date of Patent: Apr. 10, 2012

(54) CONSTANT BEARER

(75) Inventor: Hans-Herlof Hardtke, Zeven (DE)

(73) Assignee: Lisega Aktiengesellschaft, Zeven (DE)

( * ) Notice: Subject to any disclaimer, the term of this patent is extended or adjusted under 35 U.S.C. 154(b) by 0 days.

(21) Appl. No.: 13/009,165

(22) Filed: Jan. 19, 2011

(65) Prior Publication Data

US 2011/0114816 A1 May 19, 2011

Related U.S. Application Data

(63) Continuation of application No. 12/067,896, filed as application No. PCT/DE2006/001678 on Sep. 21, 2006, now Pat. No. 7,971,846.

(30) Foreign Application Priority Data

Sep. 23, 2005 (DE) .................. 10 2005 045 736

(51) Int. Cl.
*F16M 13/00* (2006.01)
(52) U.S. Cl. ........ 248/584; 248/542; 248/602; 248/614; 248/622; 267/178
(58) Field of Classification Search .................. 248/571, 248/613, 543, 542, 576, 580, 582, 584, 589, 248/593, 602, 611, 614, 622; 267/172, 173, 267/178
See application file for complete search history.

(56) References Cited

U.S. PATENT DOCUMENTS

| 2,395,730 A | 2/1946 | Farkas |
| 2,535,305 A | 12/1950 | Loepsinger |

(Continued)

FOREIGN PATENT DOCUMENTS

FR 2286330 4/1976

(Continued)

OTHER PUBLICATIONS

German Search Report dated Jan. 25, 2006 received in corresponding Application No. 10 2005 045 736.3, 4 pgs.

(Continued)

*Primary Examiner* — Terrell McKinnon
*Assistant Examiner* — Bradley Duckworth
(74) *Attorney, Agent, or Firm* — Grossman Tucker Perreault & Pfleger, PLLC

(57) ABSTRACT

The invention relates to a constant bearer for moving loads, especially pipelines and similar, comprising a fastening part, a load-bearing part, and a spring system located between the fastening part and the load-bearing part for generating a constant bearing force, where the spring system displays a main spring assembly absorbing the load and a compensating device to compensate for changing spring forces of the main spring assembly.

Figure 1:
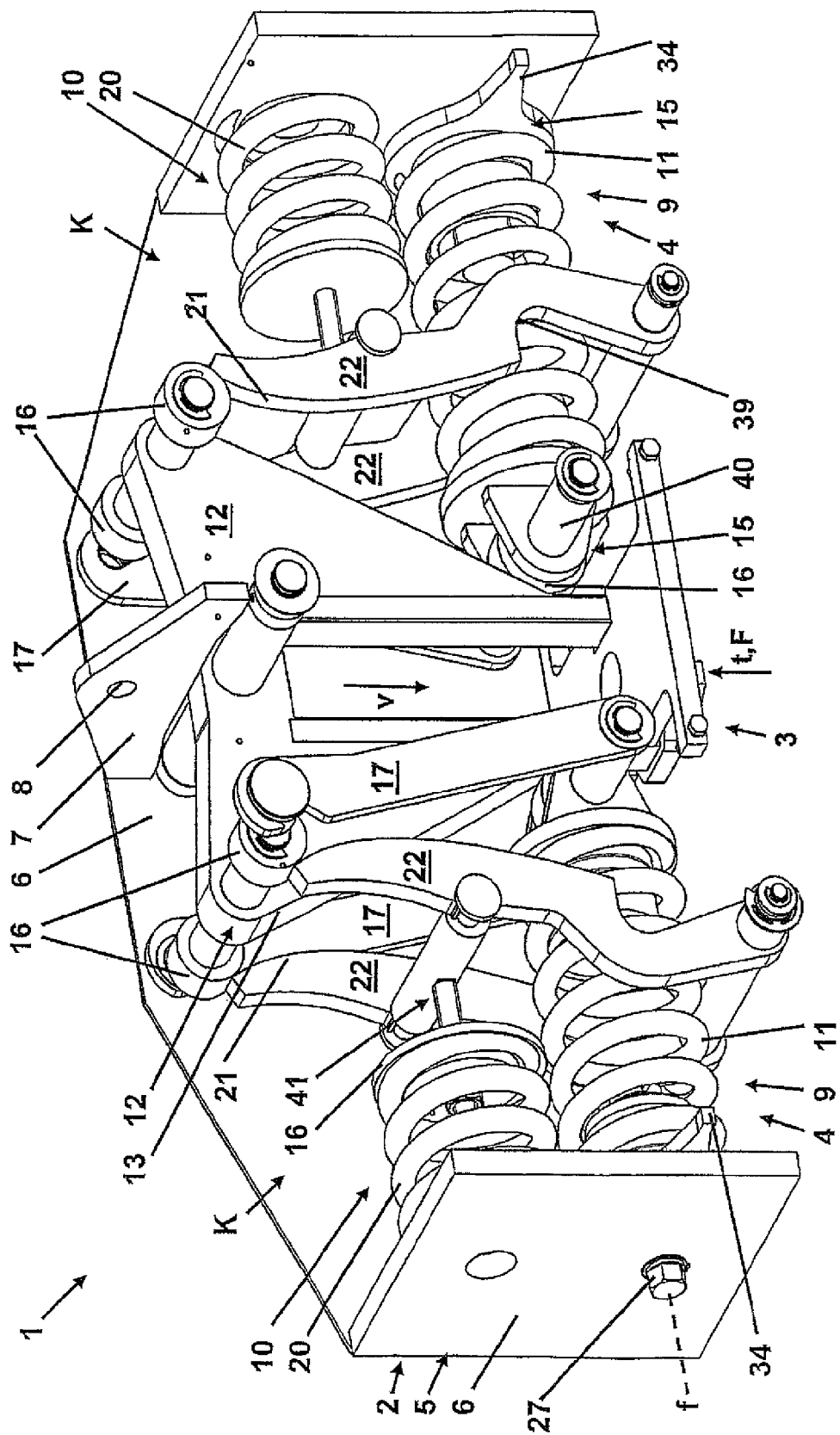

With the objective of more easily transmitting the forces of the spring assembly and enabling improved compensation for the changing forces of the main spring assembly, two basic embodiments are proposed as a solution, where, in the first embodiment, an auxiliary spring assembly, as part of the compensating device, and the main spring assembly are located roughly perpendicularly to the bearing force, at least one cam part facing the main spring assembly is provided on the load-bearing part guided in sliding fashion over a travel path in the bearing force direction, and a load side of the main spring assembly is supported on the cam part of the load-bearing part. In the second embodiment, the auxiliary spring assembly is dispensed with and compensation for changing spring forces over a spring excursion is achieved via a cam part 13 with cam lever.

24 Claims, 12 Drawing Sheets

U.S. PATENT DOCUMENTS

| | | | | |
|---|---|---|---|---|
| 2,784,962 | A | * | 3/1957 | Sherburne ..................... 267/173 |
| 3,552,695 | A | * | 1/1971 | Liesegang ..................... 248/589 |
| 3,588,010 | A | | 6/1971 | Liesegang |
| 4,613,119 | A | | 9/1986 | Hardtke |
| 4,862,742 | A | * | 9/1989 | Pospischil et al. .............. 73/161 |
| 5,018,700 | A | * | 5/1991 | Hardtke ........................ 248/571 |
| 6,026,755 | A | * | 2/2000 | Long ............................ 108/147 |

FOREIGN PATENT DOCUMENTS

| | | |
|---|---|---|
| FR | 2432669 | 2/1980 |
| GB | 893203 | 4/1962 |

OTHER PUBLICATIONS

PCT International Search Report dated Feb. 6, 2007 received in corresponding PCT Application No. PCT/DE06/01678, 3 pgs.

English translation of International Preliminary Report on Patentability received in corresponding Application No. PCT/DE06/01678, 6 pgs.

US Office Action dated Jun. 8, 2010 received in corresponding U.S. Appl. No. 12/067,896.

US Office Action dated Oct. 15, 2010 received in corresponding U.S. Appl. No. 12/067,896.

* cited by examiner

CONSTANT BEARER

CROSS-REFERENCE TO RELATED APPLICATIONS

This application is a continuation of U.S. application Ser. No. 12/067,896 filed Mar. 24, 2008, which is a national stage completion of PCT/DE2006/001678, filed Sep. 21, 2006, which claims priority to DE 10 2005 045 736.3, filed Sep. 23, 2005.

DESCRIPTION

The invention relates to a constant bearer for moving loads, especially pipelines and similar, comprising a fastening part, a load-bearing part, and a spring system located between the fastening part and the load-bearing part for generating a constant bearing force, where the spring system displays a main spring assembly absorbing the load and an auxiliary spring assembly to compensate for changing compressive forces of the main spring assembly and where the main spring assembly displays a main compression spring assembly located roughly perpendicularly to the bearing force. In this context, the fastening part serves to fasten the constant bearer to a base, and the load-bearing part to absorb the force exerted on the constant bearer by the load. The invention further relates to a constant bearer with a compensating device.

An auxiliary spring assembly is an embodiment of a compensating device that is designed to compensate for changing tensile and/or compressive forces of the main spring assembly, usually from a centre position of the constant bearer. A generic constant bearer is disclosed in publications FR 2 432 669 A1 and U.S. Pat. No. 2,535,305A, for example, where forces of the main compression spring assembly are in each case transmitted to the load-bearing part via an envisaged lever system with triangular lever.

A constant bearer with a compensating device is disclosed in U.S. Pat. No. 2,395,730 A, where, on the constant bearer, forces of the main compression spring assembly are transmitted to the load-bearing part via an envisaged lever system with triangular lever, by means of which slight compensation can be performed.

GB 893 203 A discloses a constant bearer with a main spring assembly whose spring forces are transmitted via a chain to a sprocket-wheel fixed on a triangular lever.

A non-generic constant bearer is, for example, disclosed in EP 0 188 654 A1, where the constant bearer is designed as a constant hanger with a constant tensile bearing force.

The object of the invention is to provide a constant bearer of the kind mentioned in the opening paragraph on which the forces of the spring assembly are easier to transmit and which enables improved compensation for the changing compressive forces of the main spring assembly.

According to the invention, the object is solved by the features of the characterising part of Claim 1. Given a customary, vertical arrangement of the main compression spring assembly, it is necessarily of relatively long design, since high loads usually occur with pipelines, and requires a great room height. A correspondingly smaller overall height of the constant bearer can be obtained by arranging the main spring assembly perpendicularly to the bearing force. Relative movement between the cam part and the main compression spring assembly occurs due to displacement of the cam part as a result of the action of a load on the cam part. Depending on the geometry of the cam part, the main compression spring assembly is compressed, thereby generating a corresponding spring force. The spring force acts on the load-bearing part via the cam part. Via the geometry of the cam part, the spring force can be transmitted to the load-bearing part in a desired, path-dependent manner. Other possibilities for load transmission are, in principle, also open to consideration in this context, such as lever or gear mechanisms. However, the cam part has the advantage that it is mechanically simple and robust, and that its geometry offers possibilities for correcting spring inaccuracies of the main spring assembly. In this context, the cam part can be designed so exactly that changing compressive forces of the main spring assembly can largely be compensated for and an auxiliary spring assembly can be dispensed with.

The auxiliary spring assembly can display auxiliary compression springs that run parallel to the main compression spring assembly and act on the load-bearing part via auxiliary cam parts, where the auxiliary cam parts are located on independent pivoted levers. The position of the auxiliary compression spring assemblies perpendicular to the bearing force direction, as well as the action of the auxiliary compression spring assemblies on the load-bearing part via the pivoted levers, is already described in EP 0 188 654 A1 and is therefore included in the content of this application in the embodiments described there. The parallel arrangement of the main spring assembly and the auxiliary spring assembly achieves a very small overall height of the constant bearer, particularly since the two compression spring assemblies can lie parallel to each other, either one immediately above the other or a small distance apart from each other.

To further enhance a compact design of the constant bearer, the pivoted levers of the auxiliary spring assembly can be laterally routed past the main compression spring, a distance apart from each other, and mounted on the fastening part or on the housing, while they rest on the load-bearing part, preferably the cam part, in sliding fashion with an auxiliary cam side face of the auxiliary cam part. To this end, the auxiliary compression spring assembly can, on the load side, act on the middle of the pivoted lever on a side of the pivoted lever facing away from the auxiliary cam side face. One end of the above-described lever for load-side guidance of a main compression spring can act on a pivoting point on the fastening part that is located at the level of the side of the auxiliary compression spring assembly facing away from the main compression spring. This makes it possible to achieve an advantageous, maximum lever length with the smallest possible overall height of the constant bearer.

To completely solve the object, provision can, according to the invention, be made on a constant bearer for moving loads, especially for pipelines and similar, that is provided with a fastening part, a load-bearing part, and a spring system located between the fastening part and the load-bearing part for generating a constant bearing force, where the spring system displays a main spring assembly absorbing the load and a compensating device to compensate for changing spring forces of the main spring assembly on the load-bearing part, for the compensating device to display at least one cam part, for the cam part to be coupled to the main spring assembly and the load-bearing part for load transmission from the main spring assembly to the load-bearing part, and for the load-bearing part and the cam part to be movable relative to each other on a non-linear path when the load-bearing part moves along the travel path in such a way that complete compensation for the changing spring forces of the main spring assembly on the load-bearing part can be achieved.

Thus, as in the previously described embodiments of the constant bearer, an additional auxiliary spring assembly as part of the compensating device for compensating for the change in the spring forces is superfluous. Elimination of the auxiliary spring assembly permits a further reduction in the overall height of the constant bearer. Moreover, far fewer moving parts, and fewer components in total, are required in this case than for the previously described constant bearers. This facilitates assembly and permits simpler stocking.

The profile of the cam part or the non-linear path that enables complete compensation for the change in the spring forces over the spring excursion of the main spring assembly can be exactly calculated by iteration, e.g. using a spring characteristic of the spring system over the travel path as the basis. The calculated profile can be transferred to the cam part, e.g. by means of programmable NC or CNC machines. Depending on the reasonableness of the costs and the technically feasible perfection of the design of the non-linear path, compensation can be achieved within a certain error range and thus possibly be virtually complete.

The main spring assembly can act on the cam part in non-positive and/or positive fashion for load transmission. To this end, a load end of the main spring assembly can, as described in more detail below, be supported on the cam part or mounted on the same in pivoting fashion.

The main spring assembly can preferably display a main compression spring assembly arranged roughly perpendicularly to the bearing force. As mentioned above, this makes it possible to reduce the overall height of the constant bearer.

In a development of the constant bearer, the cam part can display at least one lever that is designed as a cam lever, mounted in pivoting fashion on the fastening part, and has two side faces lying opposite each other in its longitudinal extension, a first side face and a second side face. The load side of the main spring assembly can be mounted on the first side face in pivoting fashion, or supported on it. Moreover, the second side face can be designed as a cam side face on which the load-bearing part rests in sliding or rolling fashion. The cam side face is the side face of the cam lever or the cam part, the profile of which is designed in such a way that compensation can take place via the relative movement of the cam lever and the load-bearing part or, particularly in reference to the embodiments of the constant bearer with the auxiliary spring assembly, via the relative movement of the cam part and the auxiliary spring assembly.

So that the relative movement can take place with the least possible friction, the load-bearing part can display a load roller with an axis of rotation perpendicular to the spring axis and perpendicular to the bearing force direction, and the cam side face can rest on the load roller in rolling fashion in a plane perpendicular to the axis of rotation.

The cam side face preferably rests on the load-bearing part with an area that changes over the travel path and is deflected, by a changing amount over the travel path, away from an end of the load-bearing part designed as a load-bearing end for application of the load. Thus, the load roller of the load-bearing part preferably contacts the cam side face at every point on the travel path in such a way that a force in bearing force direction can be transmitted via said side face to the load-bearing part for retaining the load. The more the area is deflected away from the load-bearing end, the greater the component in bearing force direction of the spring force transmitted by the compression spring assembly. The constant bearer is preferably set in such a way that the main compression spring assembly is compressed with a medium spring force in a middle travel position along the travel path, and a certain spring force in bearing force direction is transmitted to the load-bearing part. If the main compression spring assembly is further relaxed as the load-bearing part progresses along the travel path, the spring force is reduced more than directly proportionally to its spring excursion. To compensate for this, the component in bearing force direction of the spring force transmitted to the load-bearing part can, by greater deflection of the area away from the load-bearing end by pivoting the pivoted lever(s), be increased in such a way that the bearing force itself remains constant. This applies in the same way in the event of greater compression of the main compression springs, whose spring force is then increased more than directly proportionally to their spring excursion, where, for compensation, the component in bearing force direction of the spring force transmitted to the load-bearing part can, by greater deflection of the area towards the load-bearing end by pivoting the pivoted lever(s), be reduced in such a way that the bearing force itself remains constant.

The main spring assembly and/or the auxiliary spring assembly can, for example, display several main compression springs or auxiliary compression springs lying parallel to each other. Radially converging main compression springs and/or auxiliary compression springs can also be provided, where the cam part can in this case be designed as a body with a circular or preferably polygonal cross-section, on which the radially arranged main compression springs act on the load side. This is advantageous if the moving loads do not move essentially in a line, as with pipelines in the pipeline axis. The aforementioned auxiliary cam part for the auxiliary spring assembly can display the same embodiments.

In an advantageous development of the constant bearer, the main compression spring assembly displays two main compression springs, the load sides of which act symmetrically on the load-bearing part. The symmetry makes it possible to achieve an equilibrium of forces of the spring forces, avoiding additional moments of force. Moreover, as can particularly be seen from the drawing, centering of the lever mechanism and self-stabilisation of the constant bearer can be achieved, this enabling steady suspension or support of the load.

The fastening part can comprise a fastening device for fastening the constant bearer on a base. Furthermore, the fastening part can display a housing, which laterally encloses, and thus protects, the load-bearing part and the spring system. The housing can furthermore display side walls encompassing retaining points and/or bearing points for the spring system. The constant bearer can, as described in the prior art, be designed as a constant hanger. The constant bearer can, however, also be designed as a constant support with constant compressive bearing force. Since the bearing force, be it a compressive or a tensile force, can be compensated for by a spring system that is independent of gravity, the constant bearer can also be used in any position in space.

In a preferred development of the main compression spring assembly, the main compression springs are located on a common spring axis. Furthermore, provision can be made for the main compression springs, lying opposite each other, to be supported on the cam part with their load side and on the fastening part with a fastening side.

In one embodiment of the constant bearer, the cam part can display an associated cam side face for each main compression spring. To this end, the cam part can display an opening, or be designed as a structure surrounding an opening, where the springs act on the inner side of the opening. To this end, the inner sides should be designed as cam side faces, on which the load sides of the springs slide or move in some other way relative to the cam side faces. Since it is of less complex design and saves space, an embodiment of the constant bearer is preferred in which the cam part is located between the main compression springs.

The cam part is expediently designed as a plate-like component with narrow side faces, where the two cam side faces are formed by two opposite, mirror-symmetrically arranged narrow side faces. This makes it possible to achieve a particularly flat design of the constant bearer. Furthermore, as a result of the mirror-symmetrical arrangement, the spring forces can be transmitted to the cam part or to the load-bearing part in a manner free of moments of force in the sum of the forces. The main compression springs preferably have identical characteristics. Moreover, helical springs are preferred as the main compression springs.

In a development of the constant hanger with auxiliary spring assembly, the cam side faces can be separated from each other by a conical or roughly conical gap. A purely conical gap results in linear conversion of the travel path into the spring excursion, or of the spring forces into the bearing force, this being approximately sufficient. In an improvement of the profile of the cam side faces, deviations from the conical form can be provided as part of the compensating device in order to achieve compensation for changing compressive forces of the main spring assembly and/or, as described below, in order to achieve compensation of changing force directions, particularly changing compressive force directions. This compensation can be so extensive that an auxiliary spring assembly can be dispensed with. The transmission of the spring force can be set via the conical angle.

The main compression springs can be mounted in abutments, a first load abutment or a second load abutment on the load side and a fastening abutment on the fastening side of the main compression springs.

To reduce the friction during relative movement between the load side of the main spring assembly and the cam part, it is possible, particularly on the constant hanger with auxiliary spring assembly, to provide, on the load side of the main compression springs, a first load abutment with a rotating roller having an axis of rotation perpendicular to the spring axis and to the bearing force direction, via which the main compression springs are supported on the cam part in rolling fashion.

On a constant hanger without auxiliary spring assembly, provision can advantageously be made for each main compression spring to have a cam lever assigned to it. Furthermore, each main compression spring can be supported in the second load abutment in a supporting area of the first side face of one of the cam levers. Advantageously, the cam levers can, in an area removed from the supporting area in the bearing force direction, be mounted on the fastening part in pivoting fashion in a pivoting plane parallel to or on the spring axis and parallel to the bearing force direction.

The cam side faces of both cam levers can rest on the load-bearing part in sliding or rolling fashion. A load roller can be assigned to each cam lever to this end. The load rollers can be located on a common load roller axle in rotating fashion and are in this context expediently positioned on the load roller axle in individually rotating fashion. This permits a more compact design of the constant bearer. In this context, the cam side faces are, in installation position and in operation, expediently oriented in such a way that they are capable, in every travel position of the load-bearing part along the travel path, of exerting a force on the rollers with a force component $F_s$ in bearing force direction and a force component in the direction of spring axis f and perpendicular to force component $F_s$. In this context, the force components in the direction of the spring axis can, thanks to a preferably symmetrical structure or thanks to a preferably symmetrical arrangement of the main compression springs, cancel each other out and, together with the attached load, ensure that the individual moving parts of the constant bearer are held together. The cam side faces can be profiled in such a way that the force component in bearing force direction increases, from a lower travel position, in which the load-bearing part has performed maximum travel towards the load, to an upper travel position, in which the load-bearing part has performed maximum travel away from the load, in continuous, non-linear fashion to a calculated extent in such a way that the changing spring forces of the main spring assembly are compensated for when the main spring assembly is compressed and relaxed. This makes it possible to achieve a bearing force on the attached load (not shown here) that remains constant over the travel path.

Guidance of the main compression springs over their spring excursion is expediently provided.

The guide can display a lever for each main compression spring, one end of which is mounted on the load side of the respective main compression spring, and the other end of which is mounted on the fastening part in pivoting fashion at a pivoting point removed in the bearing force direction.

As a result, the main compression spring is guided over its spring excursion on the load side, in which context the main compression spring performs a pivoting movement via the lever on the load side owing to its design, this movement being dependent on the lever length and on the position of the pivoting point on the fastening part. A spring force direction, i.e. the direction in which the spring force of a compression spring acts, can thus change accordingly. To remedy this, the fastening side of the compression spring in question can, for example, be shifted in relation to the fastening part, simultaneously with the pivoting movement, in such a way that the spring axis of the main compression springs is merely displaced in parallel fashion. Considered to be more advantageous is the possibility of compensation for the changing spring forces being accomplished by pivoting of the main compression springs via the design of the cam part on which the main compression spring assembly or, more generally, the main spring assembly is supported. Thus, in the embodiment of the constant bearer without auxiliary spring assembly, the cam part can be designed in such a way that it compensates for the changes in the spring forces over the spring excursion, and the change in direction of the spring forces, by pivoting the main spring assembly. In the embodiment of the constant bearer with auxiliary spring assembly, the cam part can be designed in such a way that it compensates for the change in direction of the spring forces by pivoting the main spring assembly.

The lever assigned to a main compression spring can in each case be mounted in such a way that it runs parallel to the bearing force direction at a middle point of the spring excursion and/or a middle point of a travel path on which the load-bearing part can be displaced relative to the fastening part. The aim of this is to minimise deflection of the load end of the main compression spring perpendicularly to the spring axis. The deflection can additionally be reduced by increasing the lever length.

To achieve symmetrical forces with lower frictional forces between the moving parts, two levers per main compression spring can preferably be provided which, running parallel to each other and lying opposite each other, are laterally mounted on the load end in pivoting fashion.

On the embodiments of the constant bearer without auxiliary spring assembly, the lever can expediently form the cam lever at the same time.

In an expedient development of the constant bearer with auxiliary spring assembly, the levers can be mounted in pivoting fashion on the first load abutment. To this end, the first load abutment can display two correspondingly laterally arranged webs, bolts or the like that extend perpendicularly to the spring excursion and to the travel path, and on the free ends of which a lever is in each case mounted in pivoting fashion. The pivoting point of the levers on the fastening part can expediently be provided on a housing side wall, where the housing side wall can display a bolt, located on the inner side and extending perpendicularly to the spring excursion and to the travel path, on which the lever is mounted in pivoting fashion. To facilitate assembly of the constant bearer, the lever can to this end display a mouth-like opening, by means of which it can be slid laterally over the bolt, where the mouth-like opening opens in a directional component towards the load side of the respectively assigned main compression spring or towards the end of the lever.

In another embodiment of the guide, the first and/or the second load abutment can display a lateral, first guide projection, which extends, perpendicularly to the spring axis and to the bearing force direction, through a first guide slit provided in the fastening part and running in the direction of the spring axis, and which rests in sliding fashion on the inner side surfaces of the guide slit for guidance. This achieves direct linear guidance of the main compression springs in the direction of the spring axis.

The first guide slit can be of limited longitudinal extension. This limitation can preferably serve as a stop for the first guide projection for limiting the spring excursion of the respectively assigned main compression spring. In this way, the spring excursion can be limited to a range in which the change in the spring forces as a function of the spring excursion is as linear as possible. For setting the constant bearer to an anticipated load, provision can be made for the limit to be adjustable in the longitudinal direction of the slit. To this end, screw-type elements, for example, can be provided that can be slid and locked in position in the first guide slit. The first guide slit can expediently also be designed as a slot that can simultaneously limit a maximum possible spring excursion.

In a development, the constant bearer can preferably display a setting device for setting a pre-tension of the main spring assembly. To this end, the fastening abutment provided on the fastening side and/or the first and/or second load abutment of the main compression springs can be designed to slide and be fixed in position in the direction of the spring axis. In a customary embodiment, the abutments can in each case expediently display an abutment disc on which the main compression spring is supported at the face end. The abutment disc can be adjustable in sliding fashion in the direction of the spring axis by means of a screw connection. To facilitate mounting of the main compression springs in the abutments, the abutments can in each case display a sleeve that extends from the abutment disc towards the main compression springs, surrounding them at their ends or extending into them at their ends. The ends of the main compression springs should expediently rest laterally on the sleeve. This prevents the main compression springs from laterally slipping off the abutment discs.

The abutment disc of the fastening abutment can display a concentric through-hole with an internal thread, through which a bolt with an external thread mating with the internal thread is passed, where the face end of the bolt facing away from the main compression springs is mounted on the fastening part in rotating fashion. The abutment disc can thus be displaced by turning the bolt. The spring force acting on the abutment disc prevents the abutment disc from also rotating when the bolt is turned. Provision can additionally be made for anchoring of the spring in the abutment to be provided in the circumferential direction of the abutment disc.

To achieve easy turning of the bolt, the face end of the bolt facing away from the main compression spring can display a journal with a smaller diameter than the bolt, which extends concentrically in the longitudinal direction and which, in installation position, extends through a bearing opening adapted to it in the fastening part and is provided with an operating end projecting beyond the bearing opening for application of a tool, while the face end of the bolt is supported on the edge of the bearing opening. This operating end can, for example, be designed as a screw head, a hand wheel or a hand lever. To indicate the number of turns of the operating end, a scale running around the bearing opening, or a counter, can be provided on the outside.

In a preferred development, the face end of the bolt facing towards the load-bearing part in installation position can display a laterally projecting stop running against the bearing opening to limit the adjusting travel. This stop can, for example, be designed as a locking split-pin projecting beyond the outer perimeter of the bolt. As a result of displacement of the abutment in the direction of the spring axis, the spring is correspondingly compressed or relaxed on its spring excursion, meaning that a certain preload can be set in this way, with which the main compression spring acts on the load-bearing part. The preload can be set in such a way that it corresponds to an anticipated load in a position of rest. Pre-setting and adjustment via an additional adjusting device is thus possible, as in EP 0 188 654 A1. The teaching of EP 0 188 654 A1 relating to the fundamental method for presetting and adjusting the main spring assembly is therefore included in the content of this application.

To indicate the displacement of the abutment disc, the abutment disc can display a lateral, second guide projection which, in order to indicate the relative position of the abutment disc, extends through the fastening part through a second guide slit extending in the direction of the spring axis. The second guide slit can be provided in a housing side wall of the fastening part in this context. A scale or the like for reading-off the position of the lateral, second guide projection can be provided on the outer side of the housing side wall, adjacent to the slot. Owing to the simple, almost linear relationship between spring excursion and spring force, the scale can also be designed as a load scale for reading-off a spring force preset as a preload. To improve its guidance, the abutment disc can also display two lateral, opposite projections that extend through two second guide slits. As a result, a certain presetting of the preload can be read-off on two sides. The second guide slit can expediently be designed as a slot, which can simultaneously limit the maximum possible displacement of the abutment disc.

For guidance, the cam part can display a lateral, third guide projection that extends, perpendicularly to the spring axis and to the travel direction, through a third guide slit, provided in the fastening part and running in the direction of the spring axis, and rests in sliding fashion on the inside surfaces of the third guide slit. In this context, the third guide projection can also extend on both sides of the cam part into two third guide slits running parallel to each other. The third guide slits can be located in housing side walls. The third guide slits can likewise be designed as slots. On the outer side of the housing side walls, scales designed as distance scales can be provided along the third guide slit(s) to indicate the travel path of the guide projection(s). Furthermore, according to the prior art, particularly according to EP 0 188 654 A1, an adjusting device can be provided for setting and readjusting a pre-tension of the main compression spring assembly and a zero position of the cam part on its travel path. To permit quick and simple reading-off of the deflection of the third guide projection from its zero position in normal operation, it is possible to provide, in addition to the distance scale or instead of the distance scale, markings that indicate the zero position and the permissible deflection from the zero position, for example. Symbols and/or coloured markings can be used for this purpose, for example.

As mentioned above, the constant bearer can be used as a constant hanger or as a constant support. If the constant bearer is used as a constant hanger, the fastening part with a fastening device is located at the top when the constant bearer is in its installation position, the load-bearing part for attaching the load being at the bottom. The load-bearing part thus acts on an attached load via a constant tensile bearing force. The fastening device can expediently display straps and eyes for suspension from a base, on which the constant bearer designed as a constant hanger can preferably be located in pivoting fashion. Via a pivoting movement, the constant bearer can thus follow the movement path of the moving loads, meaning that the bearing force direction remains essentially constant in relation to the constant bearer. If, for example, the constant bearer is used as a floor-mounted constant support, the fastening part is at the bottom in installation position and connected to the floor as the base, while the load-bearing part is located at the top to receive a load, such that the spring system acts on a deposited load with a constant compressive bearing force. However, the functional principle based on the spring system also makes it possible to use the constant bearer as a constant hanger or a constant support in any position in space.

As can also be seen directly from the drawings below, the constant bearer can be of symmetrical design.

In order to accommodate very great loads, for example, one main compression spring, two symmetrically arranged main compression springs, or every main compression spring, can be expanded to encompass two or more main compression springs in the first embodiment of the constant bearer with auxiliary spring assembly and/or the second embodiment without auxiliary spring assembly. These main compression springs can preferably be arranged parallel to each other and, also preferably, one above the other or alongside each other as regards the travel path. The main compression springs can also be arranged coaxially to each other, where a main compression spring located coaxially on the inside expediently displays an outside diameter that is smaller than the inside diameter of a main compression spring located on the outside. In the same way, the auxiliary spring assembly provided can display auxiliary compression springs arranged coaxially to each other.

Figure 2A:
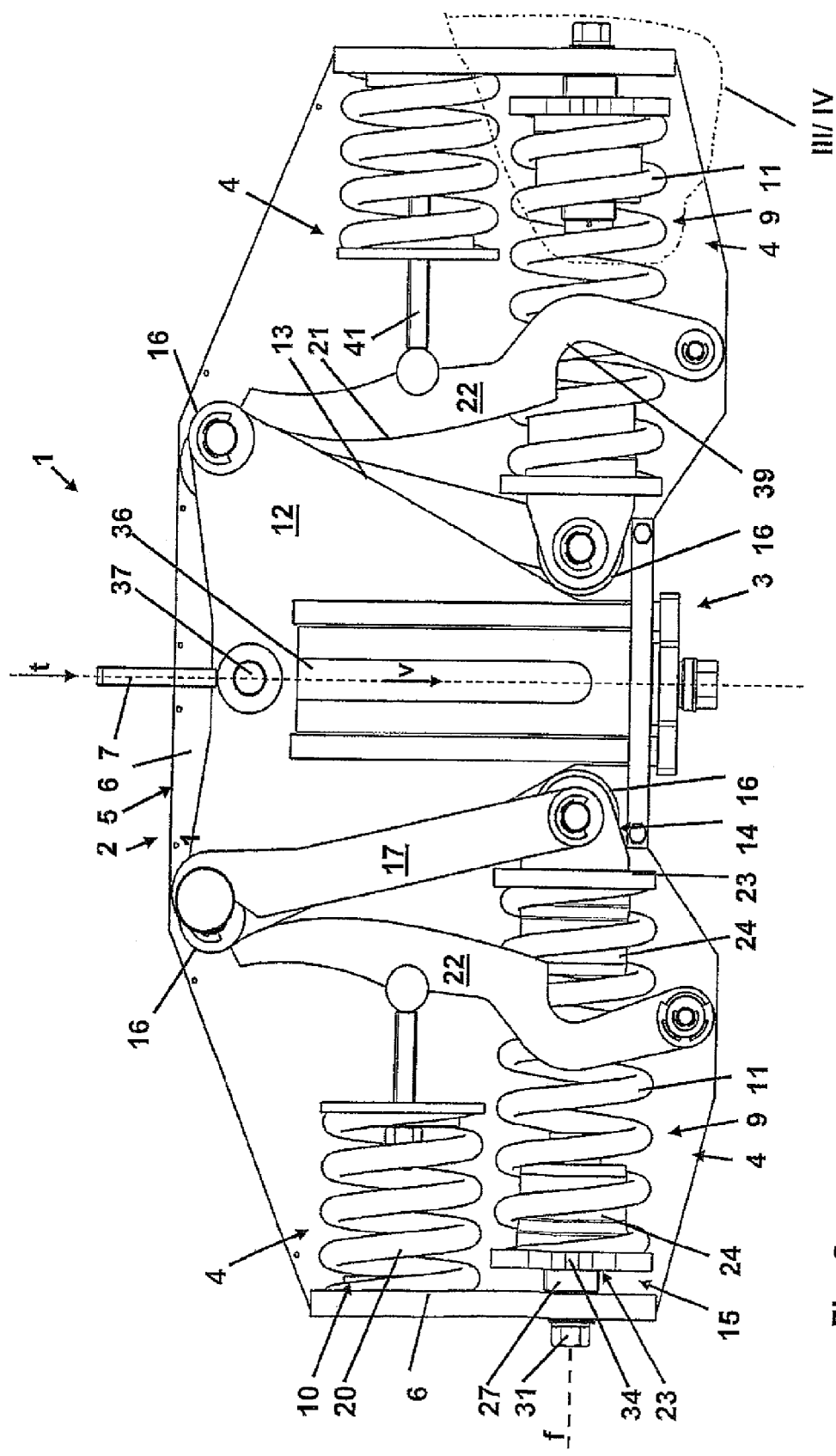
Figure 2B:
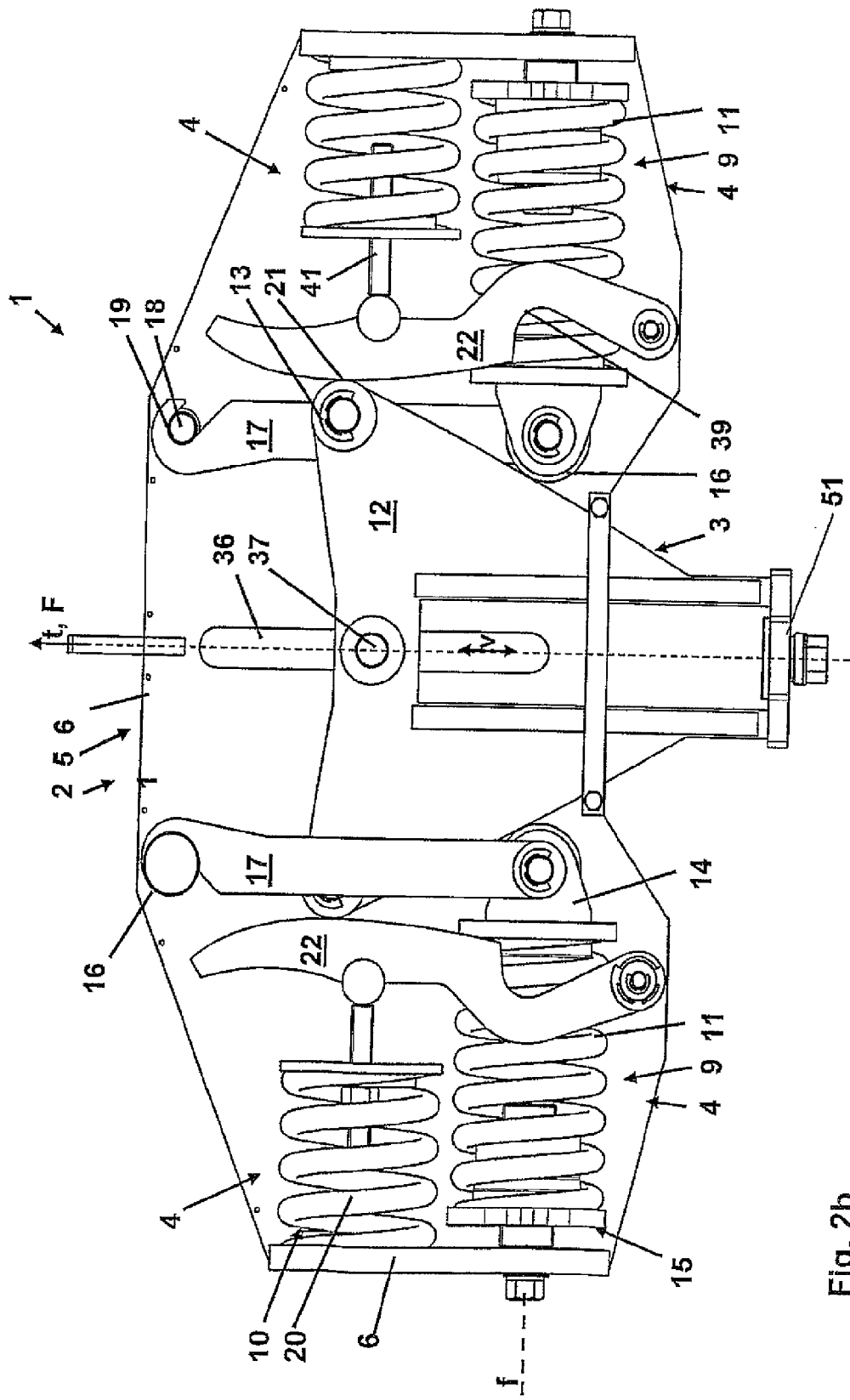
Figure 2C:
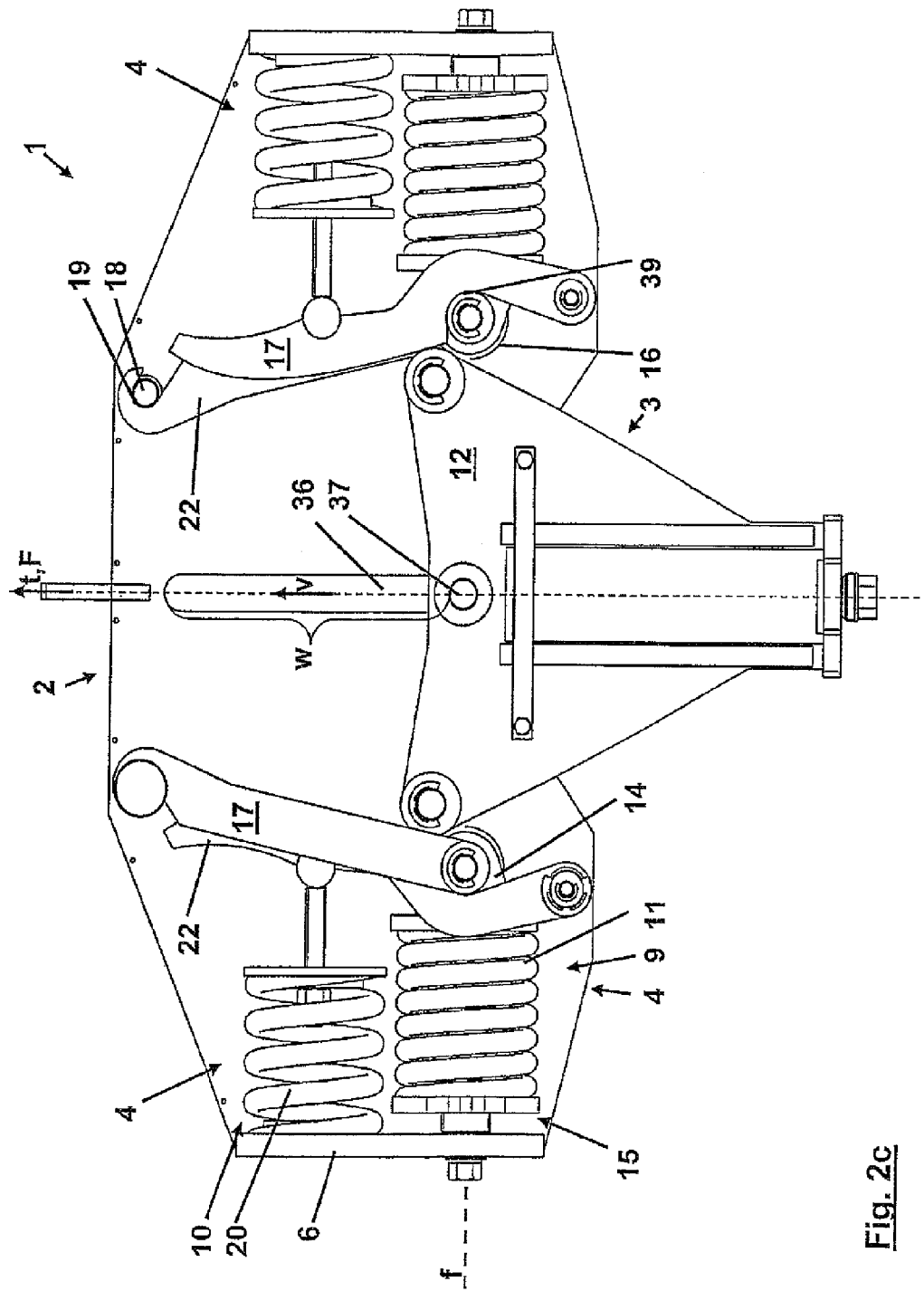
Figure 3:
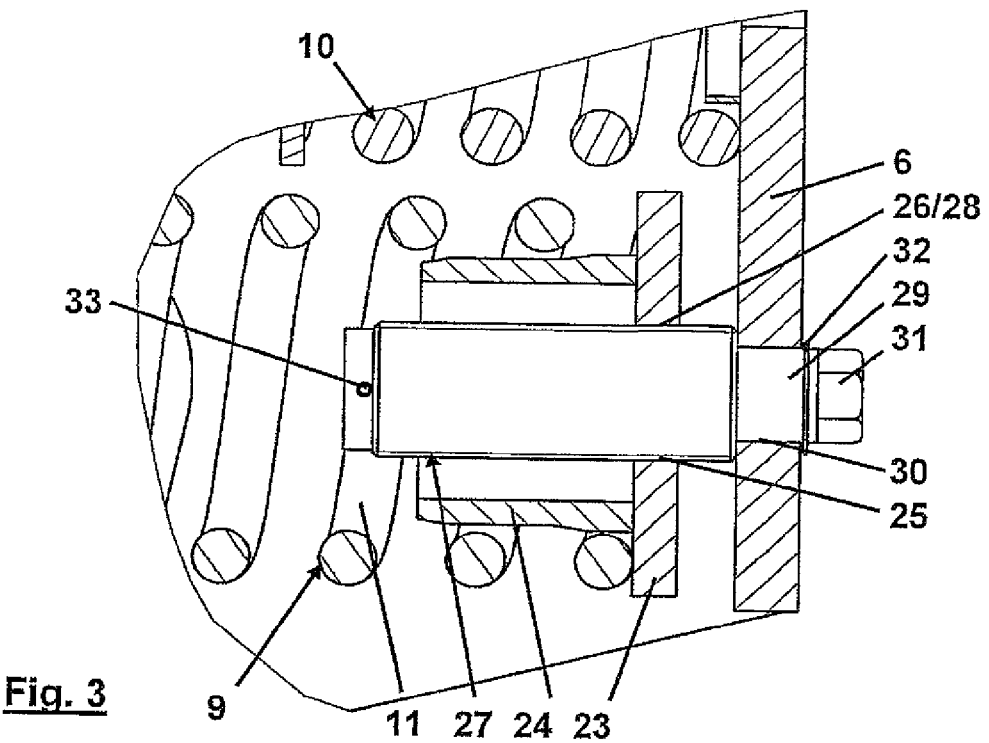
Figure 4:
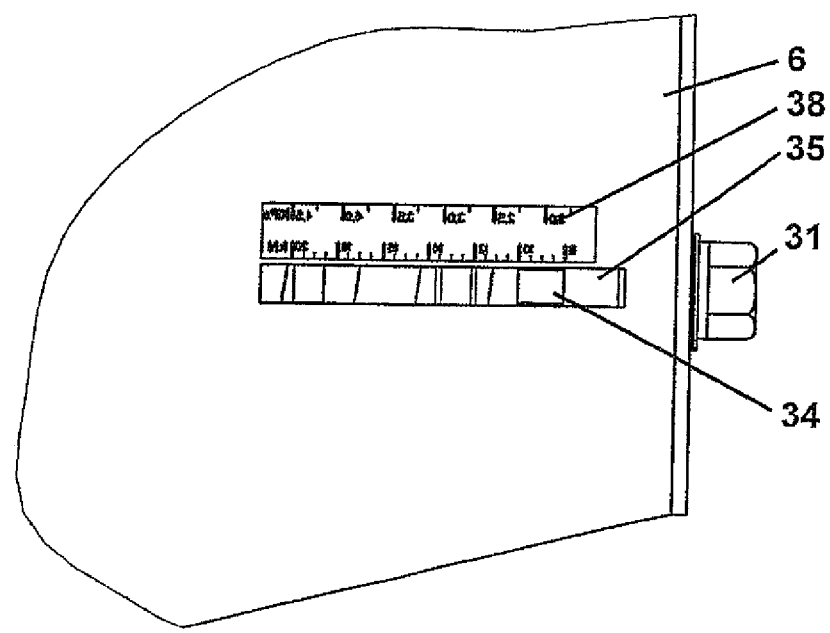
Figure 5A:
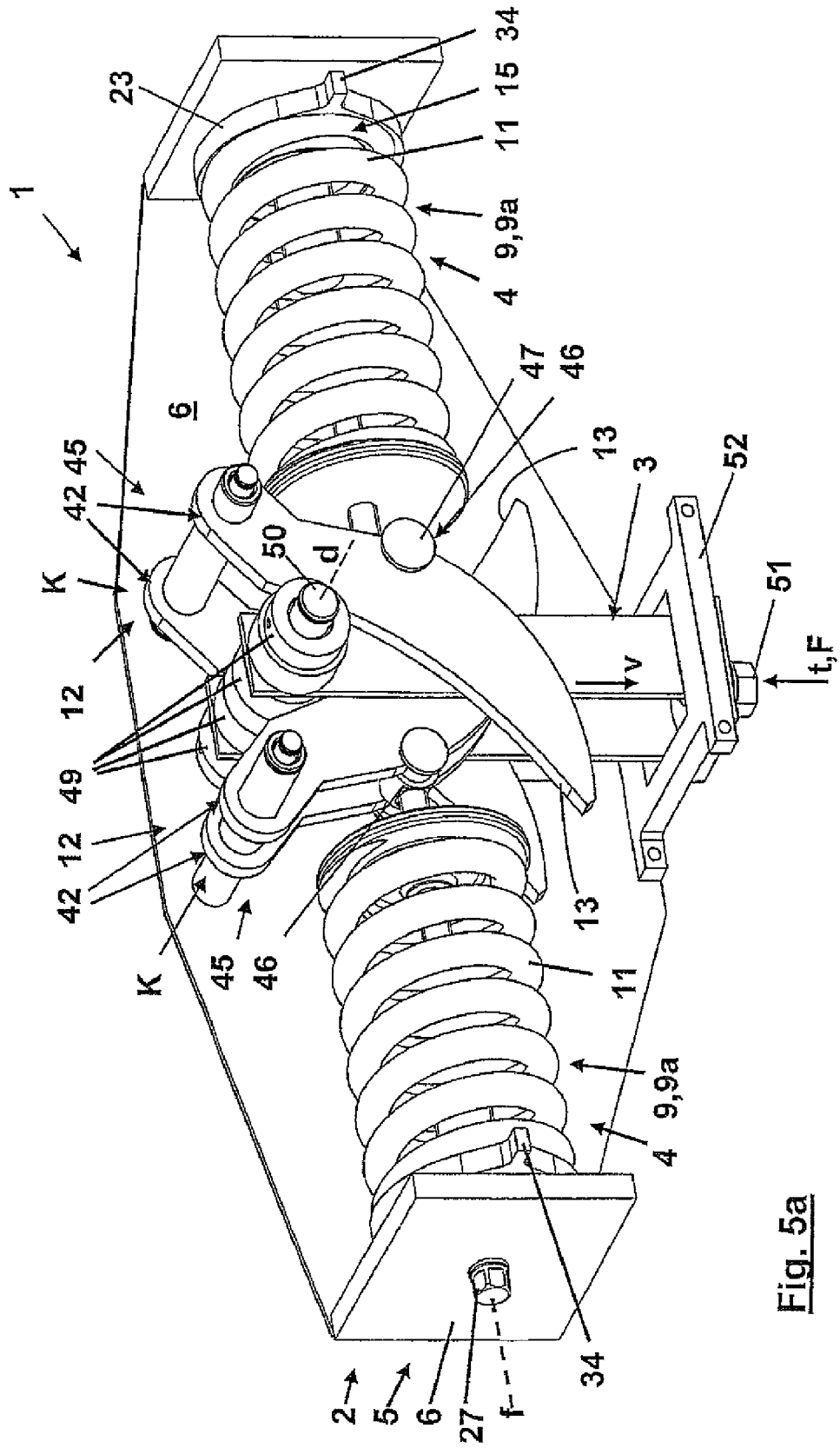
Figure 5B:
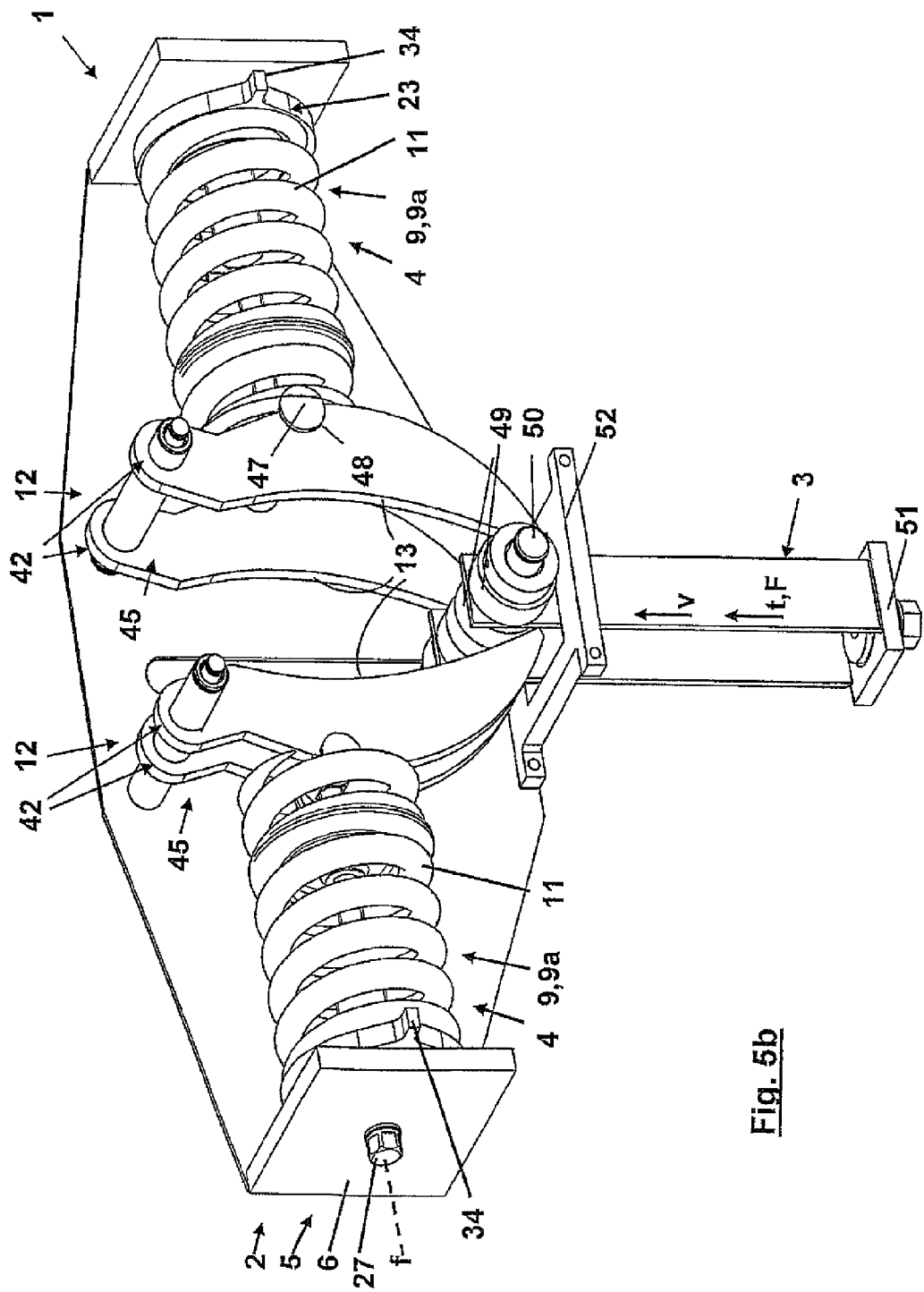
Figure 6A:
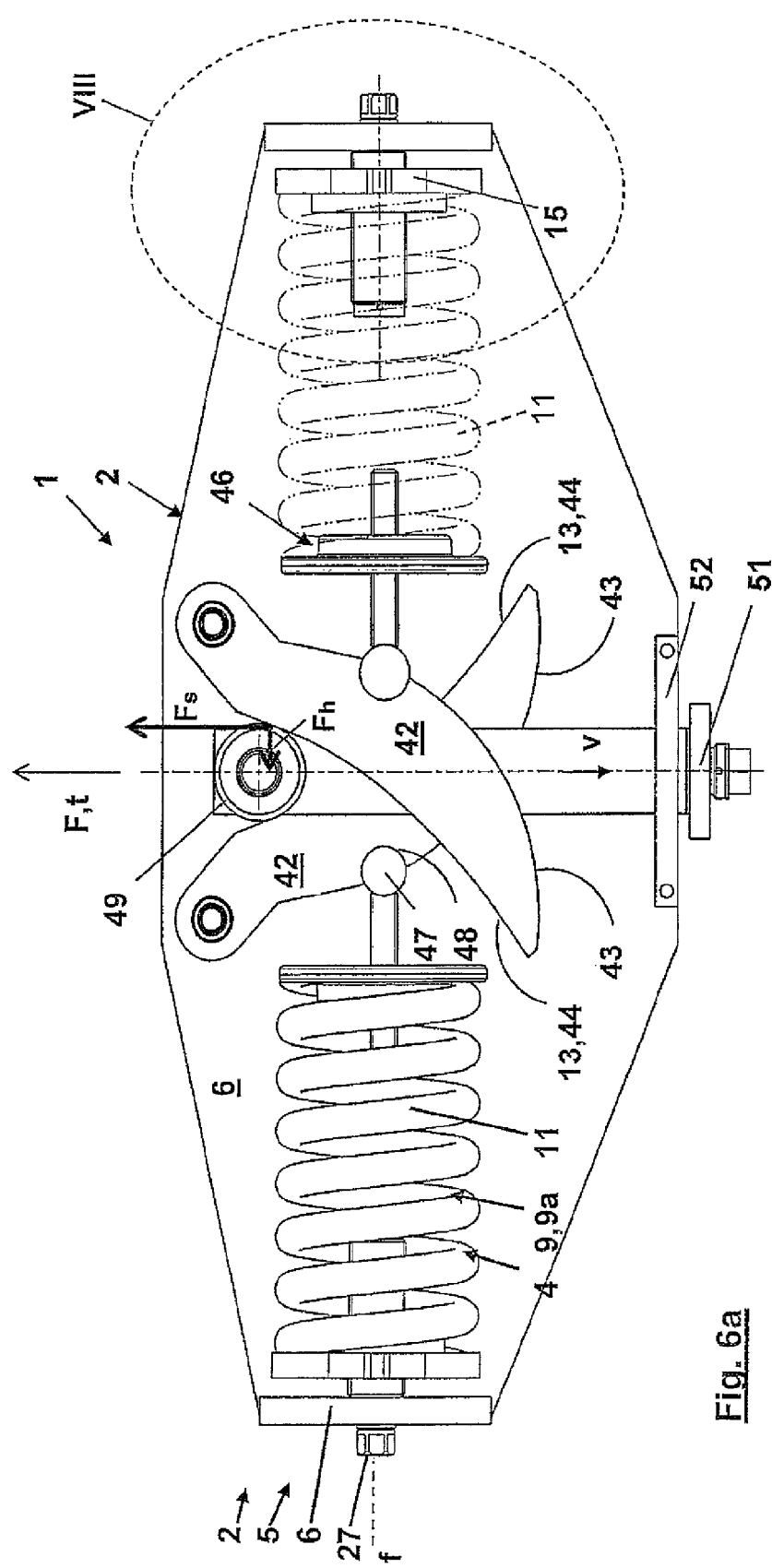
Figure 6B:
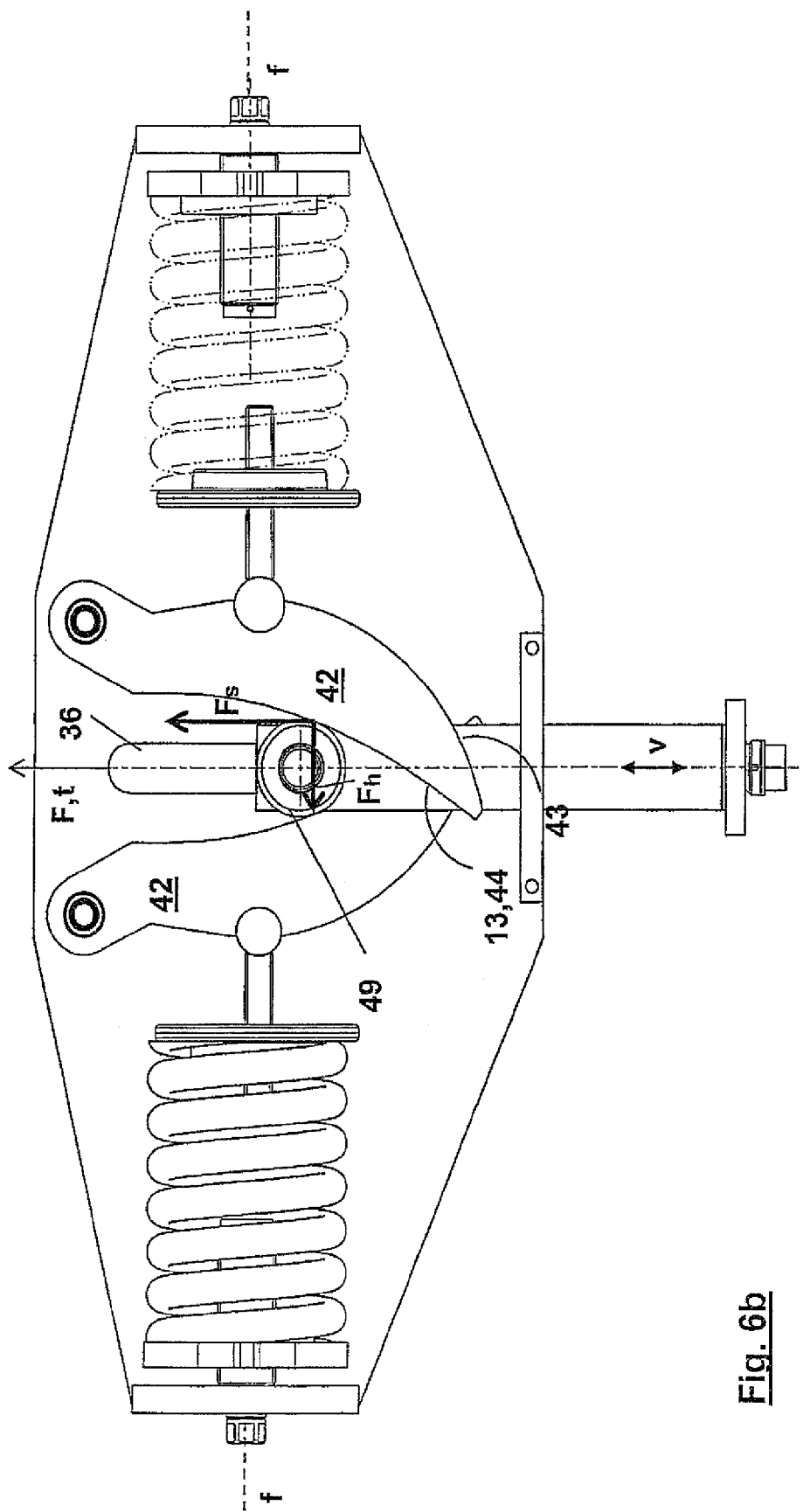
Figure 6C:
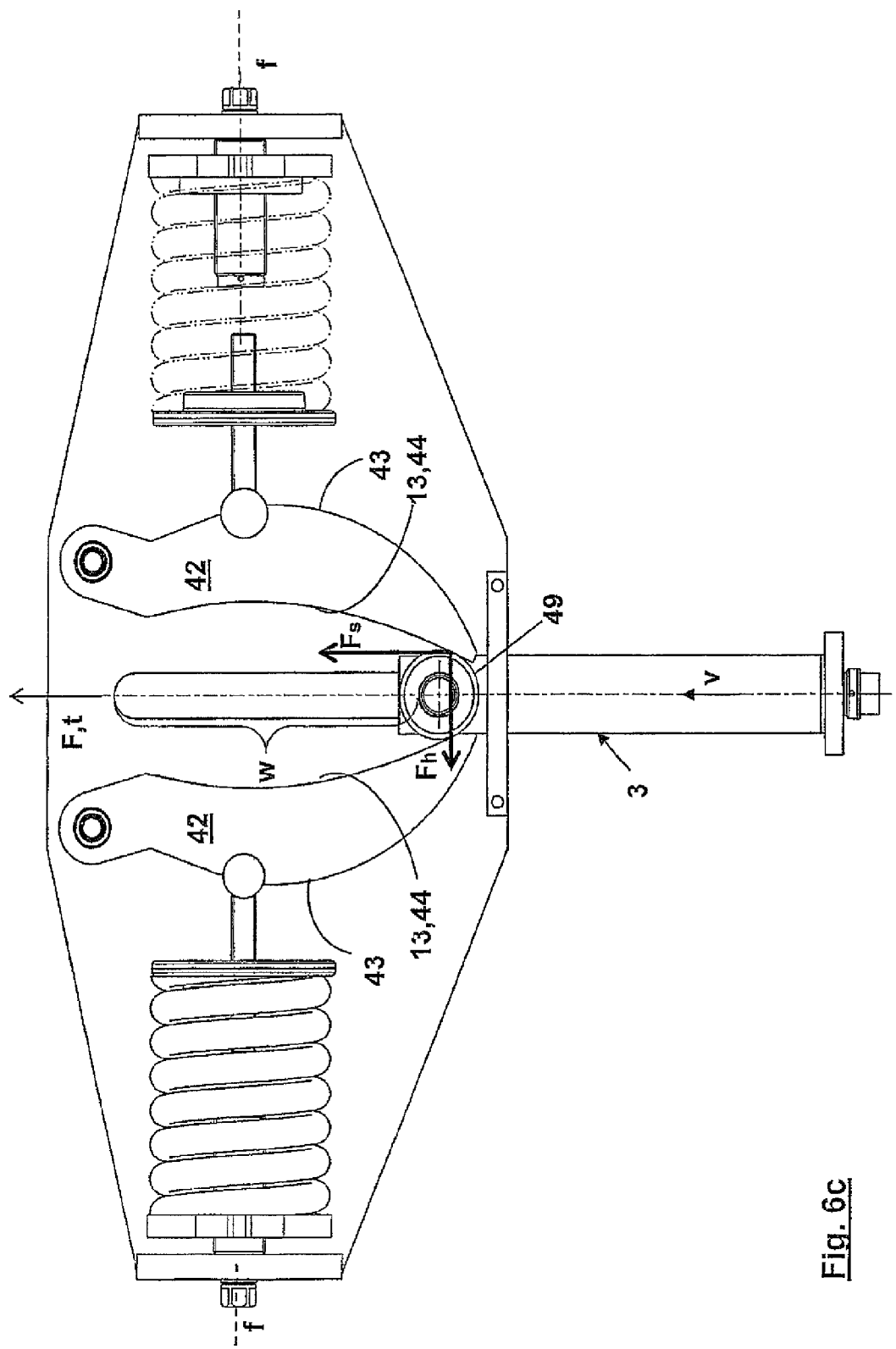
Figure 7A:
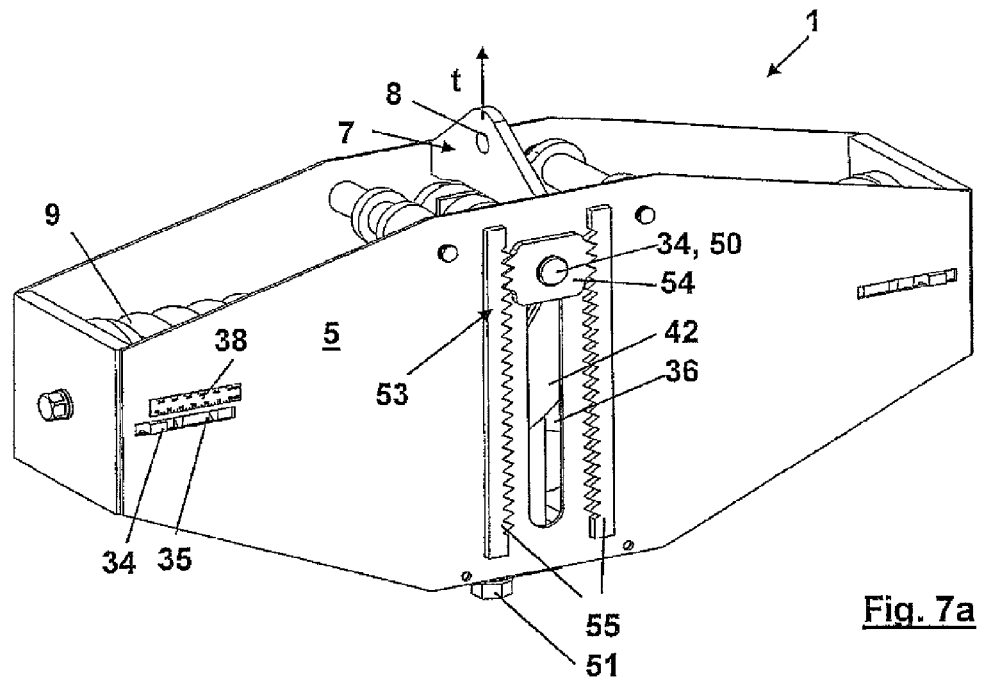
Figure 7B:
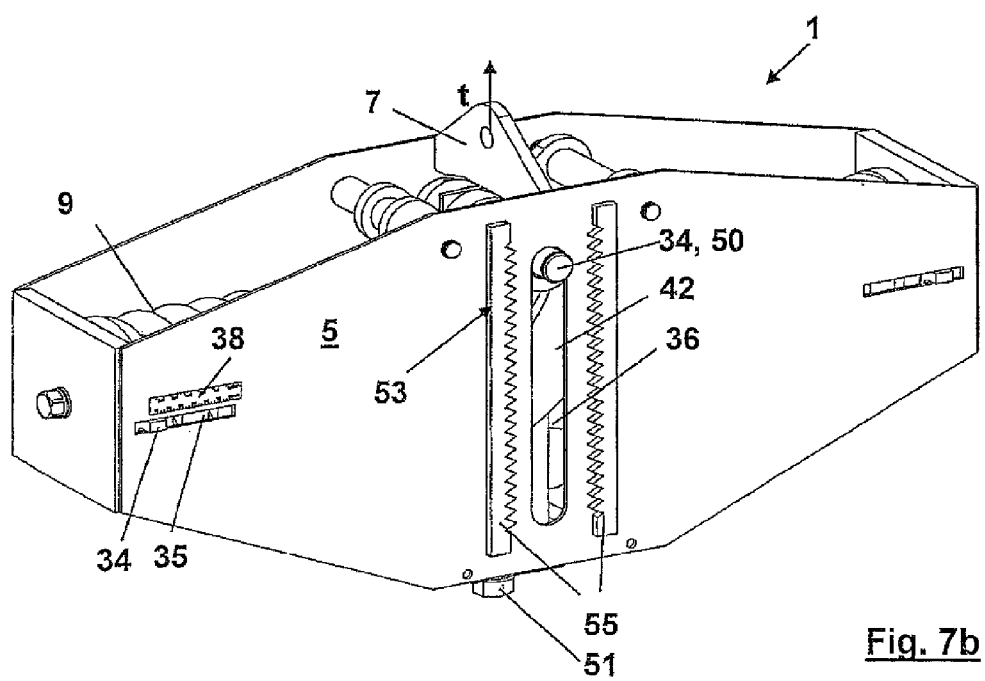
Figure 8:
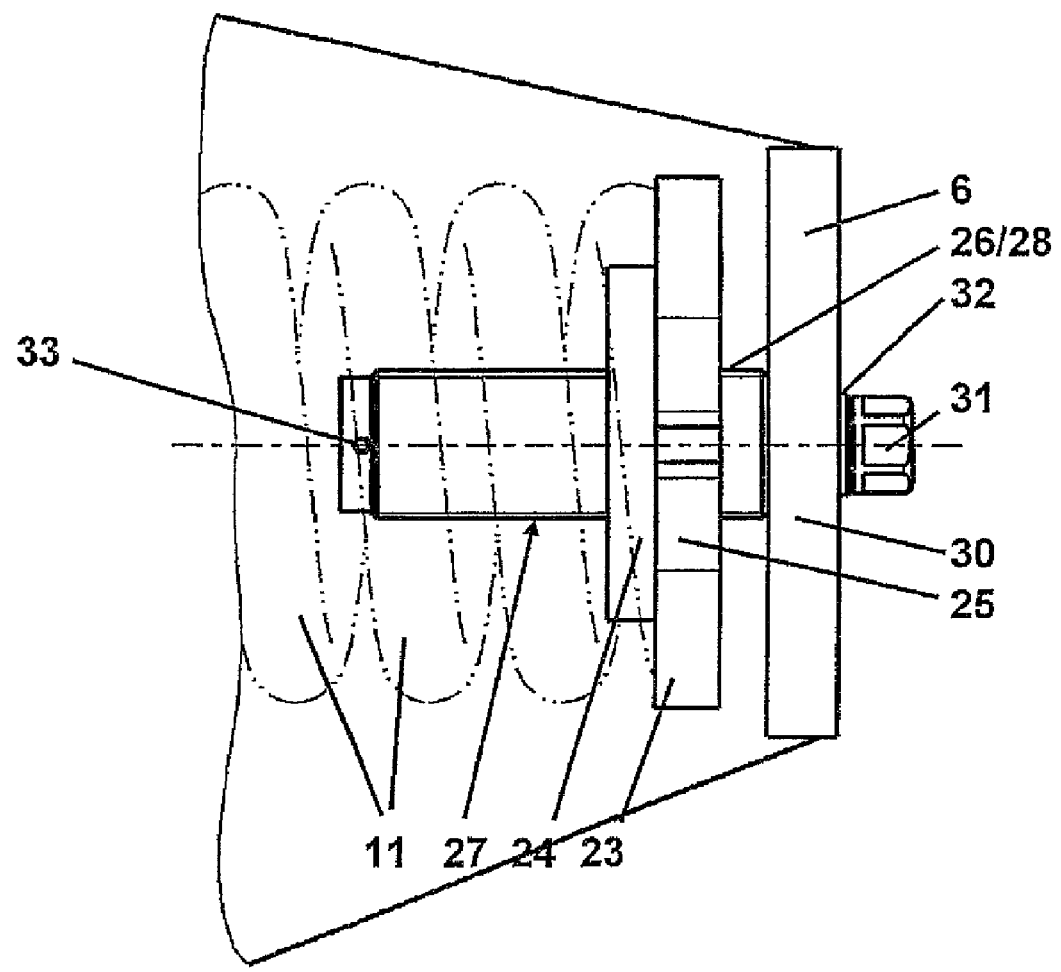

The invention is described in more detail below based on two practical examples with an associated drawing. The Figures show the following:

FIG. 1 A perspective view of a first embodiment of a constant bearer, without front housing side wall, front right lever and connecting strap, FIG. 2a A side view of the constant bearer according to FIG. 1, in an upper travel position, FIG. 2b A side view of the constant bearer according to FIG. 2a, but in a middle travel position, FIG. 2c A side view of the constant bearer according to FIG. 2b, but in a lower travel position, FIG. 3 A detail according to FIG. 2a, but with partial sections, FIG. 4 A detail according to FIG. 2a, but with additional front housing side wall, FIG. 5a A perspective view of a second embodiment of the constant bearer, with a load-bearing part in the upper travel position and without front housing side wall and connecting strap, FIG. 5b A perspective view of the second embodiment according to FIG. 5a, but in the lower travel position, FIG. 6a A side view of the constant bearer according to FIG. 5a, FIG. 6b A side view of the constant bearer according to FIG. 6a, but in a middle travel position, FIG. 6c A side view of the constant bearer according to FIG. 5b, FIG. 7a A perspective side view of the constant bearer, with front housing side wall and inserted transport lock, FIG. 7b A perspective side view of the constant bearer according to FIG. 8a, without inserted transport lock, and FIG. 8 A partial side view of the constant bearer according to FIG. 6a, without front housing side wall.

FIGS. 1 to 4 show various views of a first embodiment, and FIGS. 5 to 8 of a second embodiment, of a constant bearer 1 designed as a constant hanger for moving loads (not shown), especially pipelines and similar (not shown), comprising a fastening part 2, a load-bearing part 3, and a spring system 4 located between fastening part 2 and load-bearing part 3 for generating a constant bearing force F. In both embodiments, the spring system displays a compensating device K to compensate for changing compressive forces of main spring assembly 9.

In the two embodiments illustrated here, constant bearer 1 is designed as a constant hanger with fastening part 2 at the top in installation position and load-bearing part 3 extending downwards for attaching the load not shown here. Fastening part 2 displays a housing 5 with side walls 6, of which the front side wall is in each case omitted in FIGS. 1 to 3 and 5 to 6 for greater clarity of the drawings. The two larger side walls 6 are connected to an upper connecting strap 7, which displays a fastening hole 8 for connection to and suspension from a base not shown here. Housing 5 surrounds spring system 4 and load-bearing part 3 laterally and on the top side, where load-bearing part 3 can be displaced downwards, out of housing 5, in a travel direction v over a travel path w, and back into the housing.

The first embodiment of constant bearer 1 is first described in more detail below, followed by the second embodiment.

In the first embodiment of constant bearer 1, spring system 4 encompasses a main spring assembly 9 absorbing the load and, as part of compensating device K, an auxiliary spring assembly 10 to compensate for changing compressive forces of main spring assembly 9. The two spring assemblies 9, 10 are arranged parallel to each other and perpendicularly to travel direction v, i.e. in the horizontal direction in installation position of the embodiment of constant bearer 1 shown here. This permits a compact design of constant bearer 1. Main spring assembly 9 and auxiliary spring assembly 10 act on load-bearing part 3 on the load side, being supported on housing 5 on the fastening side. Main spring assembly 9 displays a main compression spring assembly 9a with two symmetrically arranged main compression springs 11, which are located opposite each other with their load side resting on a cam part 12 of fastening part 2, where cam part 12 is located between main compression springs 11 and displays an associated cam side face 13 for each main compression spring 11.

Cam part 12 is designed as a plate-like component with an essentially triangular basic shape, where cam side faces 13 are formed by two narrow side faces of the plate-like component.

Cam side faces 13 are thus separated from each other by a roughly conical gap that widens towards the top. In this instance, main compression springs 11 are each guided in abutments 14, 15, a first load abutment 14 on the load side and a fastening abutment 15 on the fastening side. Mounted in first load abutment 14 in rotating fashion perpendicularly to travel direction v and to spring axis f is a cylindrical roller 16, via which the respective main compression spring 11 is supported in rolling fashion on cam side face 13 assigned to it. Mounted in pivoting fashion on the same axle as roller 16 and on either side of roller 16 is a lever 17 for guiding the load-side end of the respective main compression spring 11 on first load abutment 14. The other end of lever 17 is mounted in pivoting fashion at a pivoting point removed in bearing force direction t on the inner side of housing 5, where housing 5 displays a bolt 18, located on the inner side and extending perpendicularly to spring axis f and to travel direction v, onto which lever 17 can be laterally slid via a mouth-like opening 19 provided at the end. Opening 19 has a directional component pointing towards the other end of lever 17, meaning that the lever, the design of which is such that it is exposed to tensile stress in operation, is securely mounted in opening 19. The mouth shape of opening 19 is selected for easy connection of lever 17 to housing 5 in pivoting fashion when assembling constant bearer 1.

FIGS. 2a to 2c illustrate the travel of load-bearing part 3 into three positions: an upper travel position in FIG. 2a, a middle travel position in FIG. 2b, and a lower travel position in FIG. 2c. By load-bearing part 3 moving out of housing 5, from the upper travel position towards the lower travel position, constant bearer 1 reacts to movement of the loads (not shown) attached to load-bearing part 3 away from constant bearer 1. In this context, main compression springs 11 are compressed by rollers 16 rolling on cam side faces 13 of cam part 12, thereby exerting a correspondingly increasing spring force on load-bearing part 3, and thus on the moving load, via cam part 12. Since the load sides of main compression springs 11 are in each case guided via associated levers 17, the load ends of main compression springs 11 are guided along a corresponding pivoting path, where lever 17 runs in travel direction v when in the middle travel position illustrated in FIG. 2b. The resultant deviation from linear transmission of the spring force in the direction of travel direction v, which cannot be exactly illustrated in the drawing because of its small magnitude, is corrected by a correspondingly adapted profile of cam side faces 13.

Auxiliary spring assembly 10 displays auxiliary compression spring assemblies 20, which run parallel to main compression springs 11 and, via auxiliary cam parts 21, act on cam part 12 and on load-bearing part 3, where auxiliary cam parts 21 are located on independent pivoted levers 22. In this context, pivoted levers 22 of auxiliary compression spring assembly 20 are arranged parallel to each other and a distance apart, laterally to main compression spring 11 and auxiliary compression spring assembly 20, are mounted in pivoting fashion on housing 5 at the lower end, and supported roughly in the middle on first load abutment 14 of auxiliary compression spring assembly 20.

In the upper travel position, an upper end of an auxiliary cam side face of the auxiliary cam part of pivoted levers 22 acts on the upper part of cam part 12. At this point, cam part 12 in each case displays a roller 16 for reducing friction during relative movement between cam part 12 and pivoted lever 22, where rollers 16 are mounted on cam part 12 in a manner permitting rotation perpendicular to travel direction v and to spring axis f. When cam part 12 or load-bearing part 3 moves from the upper travel position (FIG. 2a) to the lower travel position (FIG. 2c), auxiliary compression spring assembly 20 exerts different forces on cam part 12 via auxiliary cam parts 21.

In the upper travel position, auxiliary spring assembly 10 acts as a tensile force with an upward force component in travel direction v, thus intensifying the relatively low tensile force of main compression spring 11 acting on the load. In the middle travel position, the auxiliary spring assembly acts perpendicularly to the travel direction and not in travel direction v, in which context the forces in the auxiliary spring assembly cancel each other out. Main compression spring 11 acts on cam part 12 with the previously set preload in this context. This is also referred to as the zero position. In the lower travel position, auxiliary spring assembly 10 acts as a compressive force with a force component in travel direction v, thus counteracting the relatively high tensile force when the main compression springs are in compressed state. Given exact setting and design of cam parts 12, 21, the profile of the resultant force in travel direction v arising from the sum of all forces exerted on load-bearing part 3 by spring system 4 corresponds exactly to the ideal, linear characteristic of main compression springs 11. In this way, the force of main compression springs 11 with spring-induced technical deviation is compensated for to obtain a constant supporting force.

Further measures are taken for exact guidance of main compression springs 11, as well as for setting and indication. To this end, abutments 14, 15 display an abutment disc 23 with a sleeve 24, extending into the interior of main compression springs 11, where the end sides of the main compression springs rest on sleeves 24.

Fastening abutment 15 of main compression springs 11 can be displaced axially to set a pre-tension of main compression springs 11. This is illustrated in more detail in FIGS. 3 and 4, based on detail III/IV according to FIG. 2a. In FIG. 3, the detail additionally shows partial sections, whereas FIG. 4 additionally shows front housing side wall 6, which is omitted in FIG. 2a. Abutment disc 23 of fastening abutment 15 is provided with a concentric through-hole 25 with an internal thread 26, through which a bolt 27 with an external thread 28 mating with internal thread 26 is passed, where the face end of bolt 27 facing away from main compression spring 11 is mounted on side wall 6 of housing 5 in rotating fashion. For this purpose, this face end of bolt 27 displays a journal 29 with a smaller diameter than bolt that extends concentrically in the longitudinal direction, where journal 29 extends through a bearing opening 30 adapted to it in side wall 6 and has an operating end 31 projecting beyond the bearing opening on the outside for application of a tool not shown here. Bolt 27, journal 29 and operating end 31 are of one-piece design and secured by a retaining ring 32 to prevent them from falling out of bearing opening 30 in unloaded state. By turning operating end 31 or bolt 27, fastening abutment 15 is displaced in the direction of spring axis f via the meshing threads of abutment disc 23 and bolt 27, the associated main compression spring 11 thus being given a desired pre-tension. As a result, spring system 4 can be set to a certain load, as described in principle in EP 0 188 654 A1. For limitation on the one side, abutment disc 23 can run up against side wall 6, while on the other side, on the free end of bolt 27, a stop hole 33 is provided, through which a locking split-pin (not shown) can be inserted, which can simultaneously act as a stop.

Abutment disc 23 of fastening abutment 15 of main compression springs 11 is provided with a lateral, second guide projection 34, which extends, perpendicularly to spring axis f and to travel direction v, through a second guide slit 35 provided in side wall 6 and running in the direction of spring axis f, and which rests in sliding fashion on the inner side surfaces of second guide slit 35 for guidance, as can particularly be seen in FIGS. 1 and 4. Provided on the outside on side wall 6 is a load scale 38, shown in FIG. 4, on which the setting of the preload of main compression spring 11 can be read off directly via the displacement of second guide projection 34 in second guide slit 35. For this reason, the scale of load scale 38 is in the unit of force "Newton", as not explicitly shown here.

The set preload can thus be read off directly. Particularly in the event of little compression of main compression spring 11, the guidance of second guide projection 34 in second guide slit 35 additionally prevents fastening abutment 15 from rotating with bolt 27 when setting the pre-tension by turning bolt 27.

In similar fashion, guidance of cam part 12 in travel direction v is provided, where a third guide slit 36 is provided in each of the opposite, large side walls 6 of housing 5, in each of which a third guide projection 37 is guided in sliding fashion. Third guide slit 36 is designed as a slot, the ends of which simultaneously serve as a stop for limiting the travel path of fastening part 2. Third guide projection 37 moreover extends beyond third guide slit 36 and serves as a marker for adjusting the pre-tension of main compression springs 11 in relation to a certain load, as described in more detail in EP 0 188 654 A1, but not shown here for the sake of clearer presentation of the parts of spring system 4 lying behind it.

The shape of pivoted lever 22 displays a discontinuity 39 in the section between the mounting point on a large side wall 6 of housing 5 and the start of auxiliary cam part 21, via which pivoted lever 22 acts on cam part 12. By means of this discontinuity 39, pivoted lever 22, when in its lower travel position (FIG. 2c), reaches over a bolt 40 of first load abutment 14, via which lever 17 acts on first load abutment 14 in pivoting fashion and which serves to laterally separate the lever from main compression spring 11. This further improves the compact design of constant bearer 1. In the lower position, discontinuity 39, belonging to auxiliary spring assembly 10, and first load abutment 14, accommodating main compression spring 11, thus engage each other and prevent, via main compression spring 11, which is compressed to a desired minimum spring length, further downward movement of load-bearing part 3 beyond the lower travel position.

According to the cited prior art in EP 0 188 654 A1, auxiliary compression spring assembly 20 can likewise be adjusted. Associated fastening abutment 15 is set via a screw-type adjusting device 41 to this end.

The following is a more detailed description of the second embodiment of constant bearer 1, which is shown in various views and a detail in FIGS. 5a to 8.

As in the first embodiment, the second embodiment displays a horizontal main spring assembly 9 with a main compression spring assembly 9a located roughly perpendicularly to bearing force F, where main compression spring assembly 9a comprises two main compression springs 11, between which cam part 12 is located. In contrast to the first embodiment, however, the second embodiment of constant bearer 1 does not display an auxiliary spring assembly as compensating device K. Instead, cam part 12 is designed as part of compensating device K. For load transmission from main spring assembly 9 to load-bearing part 3, cam part 12 is coupled to main spring assembly 9 and load-bearing part 3. Due to the special design of the cam part, load-bearing part 3 and cam part 12 can, according to the invention, be moved relative to each other on a non-linear path in such a way that complete compensation of the changing spring forces of main spring assembly 9 acting on load-bearing part 3 is achievable when load-bearing part 3 moves along travel path w.

To this end, cam part 12 in this embodiment displays four levers designed as cam levers 42, each of which is mounted on fastening part 2 in pivoting fashion in a pivoting plane including travel direction v and spring axis f. Cam levers 42 are designed as flat components with two narrow, opposite side faces, a first side face 43 and a second side face 44, where second side face 44 is in each case designed as a cam side face 13. Pairs of cam levers 42 are combined as cam lever pairs 45 and assigned to one of main compression springs 11. Main compression springs 11 are mounted in pivoting fashion on respectively associated cam lever pair 45 via a second load abutment 46 with a cross-bolt 47, where cross-bolt 47 is rotatable, axially secured and engages a groove 48 provided in the middle area of first side face 43. Via load rollers 49, load-bearing part 3 rests on cam side faces 13 in rolling fashion, where a load roller 49 is assigned to each cam lever 42, and all load rollers 49 are mounted in rotating fashion on a common load roller axle 50 with an axis of rotation d. The spring forces of main compression springs 11 press, via second load abutment 46, against first side faces 43 of cam levers 42, which further transmit the spring forces to load-bearing part 3 via load rollers 49 assigned to them.

FIG. 5a shows load-bearing part 3 in an upper travel position, in which, as in the first embodiment, load-bearing part 3 is maximally retracted into housing 5. In FIG. 5b, load-bearing part 3 is shown in a lower travel position, in which, as in the first embodiment, load-bearing part 3 is maximally extended from housing 5. Similarly, FIGS. 6a and 6c show constant bearer 1 with load-bearing part 3 in an upper and a lower travel position, but each in a side view in this instance. Additionally indicated in FIG. 6c is a maximum travel path w of load-bearing part 3, over which it can be moved out of housing 5.

FIG. 6b shows load-bearing part 3 in a middle travel position. Due to the mounting of cam levers 42 on housing 5, the load side of main compression springs 11, which, as in the first embodiment of constant bearer 1, are each mounted on housing 5 via a fastening abutment 15, is slightly pivoted on second load abutment 44 and with fastening abutment 15 as the pivoting point. In this context, the geometries of constant bearer 1 are selected in such a way that, in the middle travel position, main compression springs 11 are perpendicular to travel direction v. For attaching a load not shown here, an end of load-bearing part 3 designed as load-bearing end 51 passes out of housing 5 through a guide aperture 52.

Via cam levers 42, a bearing force F, in this instance with a vertical force component $F_s$ in bearing force direction and a horizontal force component $F_h$ in the direction of spring axis f and perpendicular to force component $F_s$, is exerted on the rollers in every travel position of load-bearing part 3 on travel path w, where, thanks to the symmetrical structure or thanks to the symmetrical arrangement of main compression springs 11, the horizontal force components $F_h$ cancel each other out and, together with the load (not shown) located on load-bearing end 51 of load-bearing part 3, ensure that the individual moving parts of constant bearer 1 are held together. Cam side faces 13 are profiled in such a way that force component $F_s$ increases from the lower travel position to the upper travel position in continuous, non-linear fashion to a calculated extent in such a way that, when main spring assembly 9 is compressed and relaxed, the changing spring forces of main spring assembly 9, and the direction of spring axis f changed by the above-mentioned pivoting of main compression springs 11 with pivoting of cam levers 42, are completely compensated for and a constant bearing force F acts on the load over travel path w. In qualitative terms, bearing force F is roughly the sum of all vertical force components $F_s$ on load rollers 49. It goes without saying that the force arrows entered in FIGS. 6a to 6c as a bearing reaction of a cam lever 42 on a load roller 49 as an example of bearing force F and force components $F_s$ and $F_h$ are only to be interpreted qualitatively and do not indicate exact magnitudes.

The compactness of the design is improved in that, as can particularly be seen in FIGS. 5a and 5b, cam lever pairs 45 mesh in tong-like fashion on the way from the lower to the upper travel position, in that their respective cam side faces 13 roll on one of load rollers 49, which are mounted in rotating fashion on common load roller axle 50 and on which they are supported. Except in the area where cam levers 42 are linked to housing 5, the outer profile of cam levers 42 is of roughly sickle or banana-shaped design, this catering to the anticipated force and moment profile in cam lever 42 with a view to material minimisation.

As explained above, when main spring assembly 9 is set in the working position of the constant bearer, a permanent spring force of spring system 4 is exerted on the load. In the absence of a load, e.g. during transport or storage of the constant bearer, load-bearing part 3 would be accelerated against the load-bearing force with the force intended for bearing the pipeline. Therefore, a transport lock 53 with a toothed plate 54, shown in FIGS. 7a and 7b, is provided for a constant bearer when not in use. It can be fitted on load roller axis 50, extending through a third guide slit 37, and, when placed between two toothed rails 55 provided on housing 5, engages said rails and thus blocks movement of load-bearing part 3 on the travel path. Toothed plate 54 can be removed when the load is attached to load-bearing end 51 (FIG. 7b).

This transport lock 53 is also provided for the first embodiment, but omitted in FIGS. 1 to 5 for the sake of clarity.

Fastening abutment 15 and second load abutment 46 of the second embodiment are in principle designed to be adjustable in the same way as fastening abutment 15 and first load abutment 14 of the first embodiment. Similarly, a load scale 38 is also provided for more exact setting of the respective main compression spring 11. Owing to the symmetrical structure, only one load scale 38 is necessary for both main compression springs 11. As can be seen in the detail view in FIG. 8, an amended version of sleeve 24 is provided, which is in this instance advantageously of smaller design, thus facilitating assembly.

LIST OF REFERENCE NUMBERS

1 Constant bearer
2 Fastening part
3 Load-bearing part
4 Spring system
5 Housing
6 Side wall
7 Connecting strap
8 Fastening hole
9 Main spring assembly
9a Main compression spring assembly
10 Auxiliary spring assembly
11 Main compression spring
12 Cam part
13 Cam side face
14 First load abutment
15 Fastening abutment
16 Roller
17 Lever
18 Bolt
19 Opening
20 Auxiliary compression spring assembly
21 Auxiliary cam part
22 Pivoted lever
23 Abutment disc
24 Sleeve
25 Through-hole
26 Internal thread
27 Bolt
28 External thread
29 Journal
30 Bearing opening
31 Operating end
32 Retaining ring
33 Stop hole
34 Second guide projection
35 Second guide slit
36 Third guide slit
37 Third guide projection
38 Load scale
39 Discontinuity
40 Bolt
41 Screw-type adjusting device
42 Cam lever
43 First side face
44 Second side face
45 Cam lever pair
46 Second load abutment
47 Cross-bolt
48 Groove
49 Load roller
50 Load roller axle
51 Load-bearing end
52 Guide aperture
53 Transport lock
54 Toothed plate
55 Toothed rail
d Axis of rotation
F Bearing force
$F_s$ Vertical force component
$F_h$ Horizontal force component
f Spring axis
K Compensating device
t Bearing force direction
v Travel direction
w Travel path

The invention claimed is:

1. Constant bearer for moving loads, especially pipelines and similar, comprising a fastening part, a load-bearing part, and a spring system located between the fastening part and the load-bearing part for generating a constant bearing force, where the spring system displays a main spring assembly absorbing the load and a compensating device to compensate for changing spring forces of the main spring assembly on the load-bearing part, wherein the main spring assembly comprises main compression springs disposed opposite each other, wherein the compensating device displays at least one cam part, in that the cam part is coupled to the main spring assembly and the load-bearing part for load transmission from the main spring assembly to the load-bearing part, and in that, when the load-bearing part moves along a travel path, the load-bearing part and the cam part can move relative to each other on a non-linear path in such a way that complete compensation for the changing spring forces of the main spring assembly on the load-bearing part can be achieved, wherein the cam part includes at least one lever, designed as a cam lever and mounted on the fastening part in pivoting fashion, with two opposite side faces in its longitudinal extension, a first side face and a second side face, in that the load side of the main spring assembly is mounted on the first side face in pivoting fashion, and in that the second side face is designed as a concave cam side face, on which the load-bearing part rests and moves over the whole travel path of the load-bearing part, and is decreasingly deflected, over the whole travel path, away from an end of the load-bearing part for application of the load.

2. Constant bearer according to claim 1, wherein the main spring assembly displays a main compression spring assembly located roughly perpendicularly to the bearing force.

3. Constant bearer according to claim 1, wherein the load-bearing part displays a load roller with an axis of rotation perpendicular to the spring axis and perpendicular to the bearing force direction, and in that the cam side face rests on the load roller in a plane perpendicular to the axis of rotation.

4. Constant bearer according to claim 1, wherein the main compression spring assembly displays two main compression springs, the load sides of which act symmetrically on the load-bearing part.

5. Constant bearer according to claim 4, wherein the main compression springs are located on a common spring axis, and in that the main compression springs lying opposite each other are supported on the cam part on the load side and on the fastening part of a fastening side.

6. Constant bearer according to claim 5, wherein the cam part is located between the main compression springs.

7. Constant bearer according to claim 4, wherein the cam part displays an associated cam side face for each main compression spring.

8. Constant bearer according to claim 4 wherein the cam part is designed as a plate-like component with narrow side faces, where the two cam side faces are formed by two opposite, symmetrically arranged narrow side faces.

9. Constant bearer according to claim 4, wherein the cam side faces are separated from each other by a conical or roughly conical gap.

10. Constant bearer according to claim 4, wherein the at least one lever comprises at least two levers and each main compression spring has at least one of the cam levers assigned to it, in that the main compression spring is supported in a load abutment in a supporting area of the first side face of the associated cam lever, in that the cam lever is, in an area removed from the supporting area in the bearing force direction, mounted on the fastening part in pivoting fashion in a pivoting plane parallel to or in the travel direction and the spring axis, and in that the cam side face of the cam lever rests on the load-bearing part in sliding or rolling fashion.

11. Constant bearer according to claim 10, wherein a load roller is assigned to each cam lever, and in that the load rollers are located on a common load roller axle in rotating fashion.

12. Constant bearer according to claim 4, wherein a guide provides direct linear guidance of the main compression springs in the direction of the spring axis.

13. Constant bearer according to claim 4, wherein the at least one lever comprises at least one lever for each main compression spring, one end of which, or a middle area of which, is mounted on the load side of the respective main compression spring, and the other end of which is mounted on the fastening part in pivoting fashion at a pivoting point removed in the bearing force direction.

14. Constant bearer according to claim 13, wherein the at least one lever for each main compression spring is mounted in such a way that it runs parallel to the bearing force direction at a middle point of the spring excursion.

15. Constant bearer according to claim 13, wherein two levers are provided for each main compression spring which, running parallel to each other and lying opposite each other, are laterally mounted on the load end in pivoting fashion.

16. Constant bearer according to claim 1, characterised by a setting device for setting a pre-tension of the main spring assembly.

17. Constant bearer according to claim 16, wherein the main compression springs are each mounted in a fastening abutment and/or the load abutment designed to slide and be fixed in position in the direction of the spring axis.

18. Constant bearer according to claim 17, wherein the abutments each display an abutment disc, on which the main compression spring is supported at the face end and which can be adjusted in sliding fashion in the direction of the spring axis by means of a screw-type device.

19. Constant bearer according to claim 18, wherein the abutment disc of the fastening abutment displays a concentric through-hole with an internal thread, through which a bolt with an external thread mating with the internal thread is passed, where the face end of the bolt facing away from the main compression spring is mounted on the fastening part in rotating fashion.

20. Constant bearer according to claim 19 wherein the face end of the bolt displays a journal with a smaller diameter than the bolt, which extends concentrically in the longitudinal direction and which, in installation position, extends through a bearing opening adapted to it in the fastening part and is provided with an operating end projecting beyond the bearing opening for application of a tool.

21. Constant bearer according to claim 19, wherein the face end of the bolt facing towards the load-bearing part in installation position displays a laterally projecting stop running against a bearing opening to limit the adjusting travel.

22. Constant bearer according to claim 19, wherein the abutment disc displays a lateral, second guide projection which, in order to indicate the relative position of the abutment disc, extends through the fastening part through a second guide slit extending in the direction of the spring axis.

23. Constant bearer according to claim 22, wherein a load scale for reading-off the relative position of the second guide projection and/or for reading-off the preload is located on the outside of the second guide slit.

24. Constant bearer according to claim 1, wherein the cam part or the load-bearing part displays a lateral, third guide projection that extends, perpendicularly to the spring axis and to the spring travel direction, through a third guide slit, provided in the fastening part and running in the direction of the spring axis, and rests in sliding fashion on the inside surfaces of the third guide slit for guidance.

* * * * *